(No Model.)

C. A. PRATT.
CUSHIONING SUBSTANCE FOR BICYCLE TIRES.

No. 549,077. Patented Oct. 29, 1895.

WITNESSES:
H. A. Hall.
A. H. Abell.

INVENTOR:
Chas. A. Pratt.
By Arthur W. Crossley,
Atty.

UNITED STATES PATENT OFFICE.

CHARLES A. PRATT, OF CLINTON, MASSACHUSETTS, ASSIGNOR TO THE PNEUMATIC CELLULAR TIRE COMPANY, OF PORTLAND, MAINE.

CUSHIONING SUBSTANCE FOR BICYCLE-TIRES.

SPECIFICATION forming part of Letters Patent No. 549,077, dated October 29, 1895.

Application filed June 20, 1894. Serial No. 515,202. (No model.)

*To all whom it may concern:*

Be it known that I, CHARLES A. PRATT, of Clinton, in the county of Worcester and State of Massachusetts, have invented certain new and useful Improvements in Cushioning Substances for Bicycle-Tires, of which the following is a specification.

This invention has relation generally to yielding bicycle-tires, and particularly to the kind known as "cushioned" in contradistinction to "pneumatic."

It is well known that pneumatic tires when inflated to the proper degree and so long as they remain intact are quite perfection so far as resiliency or elasticity is concerned; but liability of puncture of the tube or other mishap permitting of the escape of air from the tube renders the pneumatic tire undesirable. A cushion-tire overcomes the objection, but encounters another in that it is difficult to secure a cushioning substance of just the requisite resiliency or elasticity combined with durability.

I have ascertained that so-called "sponge rubber" or "cellular rubber," which, in its natural condition, is too soft or yielding to subserve the purpose of stuffing or cushioning a tire, may be solidified to exactly the required extent by wrapping or winding thread or yarn about it to confine it within its normal bounds, and yet leaving appreciable interstices or openings between the wrapping-coils, so that it may be brought to a state of elasticity and firmness simulating that of air in an inflated tire, and at the same time put in a condition to protect it to an extent against disintegration and impairment of efficiency from use.

My invention therefore consists of a bicycle-tire comprising in its construction a flexible tube cushioned or filled with so-called "sponge" or "cellular" rubber compressed or confined within a compass smaller than that natural to said substance by threads or yarns wound about the said sponge-rubber, all as I will now proceed to describe and claim.

Reference is to be had to the annexed drawings, and to the letters and figures marked thereon, forming a part of this specification, the same letters designating the same parts or features, as the case may be, wherever they occur.

Figure 1:
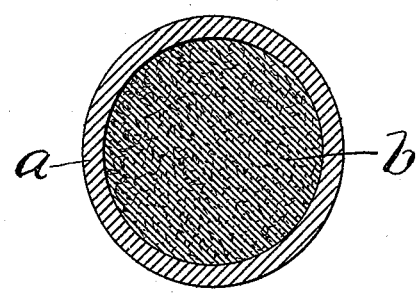
Figure 2:
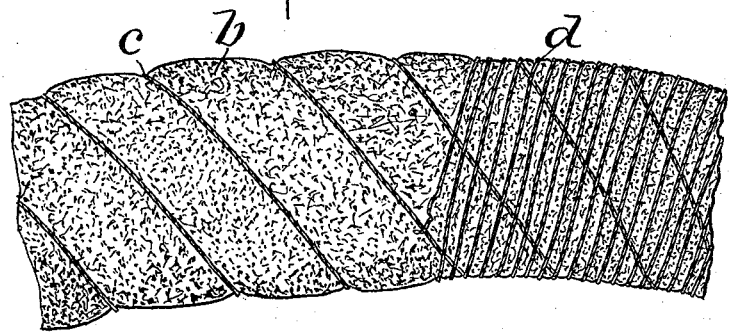
Figure 3:
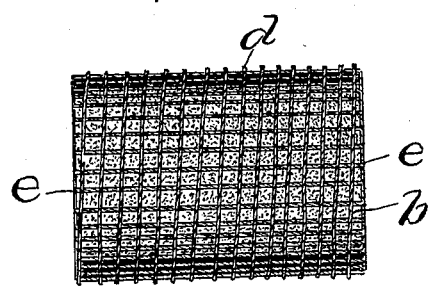

Of the drawings, Figure 1 is a cross-sectional view of a bicycle-tire embodying my invention. Fig. 2 is a side view or my improved cushioning material, showing one way in which it may be constructed and illustrating, also, the process of winding the cushioning substance. Fig. 3 is a side view of a modified form of the invention.

In the drawings, $a$ designates the tube forming the outer surface of the tire, which tube may be of rubber or caoutchouc and may be covered or confined within another tube of similar or equivalent material.

$b$ designates a body of so-called "sponge rubber," which, as is well known, is rubber or caoutchouc, embracing within it an almost infinite number of air-cells, which sponge rubber is compressed considerably within its natural confines by winding it with a thread or yarn, as shown in Figs. 2 and 3.

To avoid considerable distension of the substance $a$, I may first wind it with a thread $c$ in quite open coils or coils quite wide apart, as seen in Fig. 2, and then wind again with a thread $d$, running helically about the said substance in the opposite direction in comparatively close coils, as shown at the right in the last-mentioned figure, but always leaving appreciable openings or interstices between the coils through which the compressed rubber may bulge outward.

In some cases I propose to make up the cushion $a$ of short sections of sponge rubber confined by winding the same with thread not only running around the substance helically, but also longitudinally, as indicated at $e$ in Fig. 3.

By the process of winding the substance as stated the same may be brought to any desired degree of solidity, and it is also preserved against disintegration and injury from use, and, furthermore, in compacting the sponge rubber by winding it with a cord or thread, as described, the rubber will not be appreciably distended, as would be the case if it were compacted by a covering of textile fiber or the like; but open spaces or interstices will be left between the coils, so that the rubber can bulge out, as it were, through said spaces when pressed upon at points adjacent thereto. By this means the resilient properties of the rubber and the sensitiveness of the same is rendered much greater under my invention than is the case where a close covering—as, for example, a textile fabric—is employed.

Having thus explained the nature of the invention and described a way of constructing and using the same, though without attempting to set forth all of the forms in which it may be made or all of the modes of its use, it is declared that what is claimed is—

1. A cushioning substance for bicycle tires consisting of sponge or cellular rubber, wound with a thread or cord in opposing directions as described and compressed thereby within its natural bounds, the winding coils being open and leaving appreciable interstices between the same through which the compressed rubber may bulge outward.

2. A cushioning substance for bicycle tires consisting of sections of sponge or cellular rubber, wound both circumferentially and longitudinally with a thread or cord and compressed thereby within its natural bounds, the winding coils being open and leaving appreciable interstices between the same through which the compressed rubber may bulge outward.

In testimony whereof I have signed my name to this specification, in the presence of two subscribing witnesses, this 12th day of June, A. D. 1894.

CHARLES A. PRATT.

Witnesses:
ARTHUR W. CROSSLEY,
EUGENE BOUDÉT.